Jan. 23, 1923.

H. CHALMERS.
BUTTON CUTTING MACHINE.
FILED OCT. 26, 1921.

Inventor
Harvey Chalmers
By Frank C. Curtis
Attorney

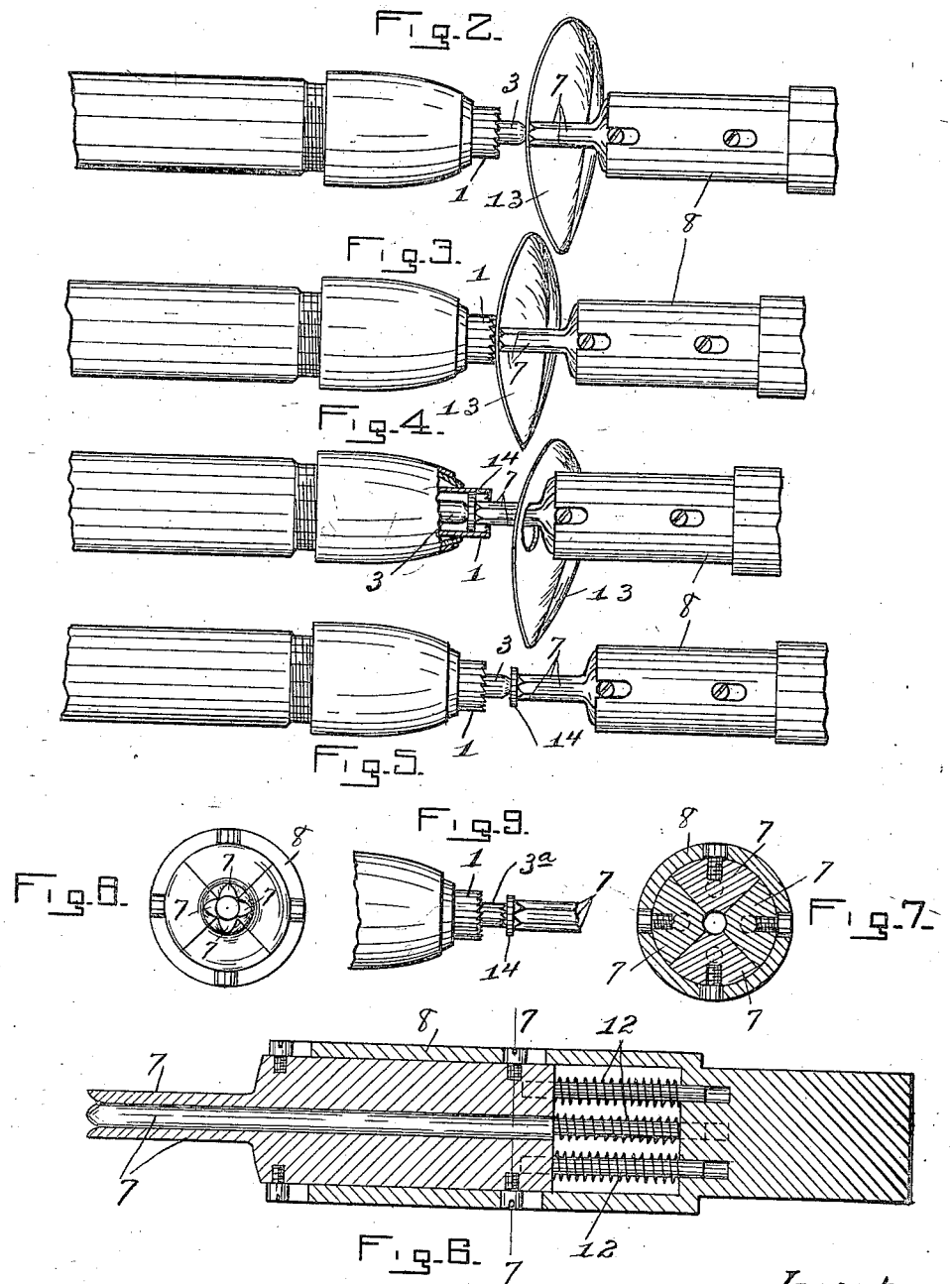

Patented Jan. 23, 1923.

1,442,794

UNITED STATES PATENT OFFICE.

HARVEY CHALMERS, OF AMSTERDAM, NEW YORK, ASSIGNOR TO HARVEY CHALMERS & SON, OF AMSTERDAM, NEW YORK, A PARTNERSHIP.

BUTTON-CUTTING MACHINE.

Application filed October 26, 1921. Serial No. 510,552.

*To all whom it may concern:*

Be it known that I, HARVEY CHALMERS, a citizen of the United States, residing at Amsterdam, in the county of Montgomery and State of New York, have invented new and useful Improvements in Button-Cutting Machines, of which the following is a specification.

Reference may be had to the accompanying drawings, and the reference characters marked thereon, which form a part of this specification. Similar characters refer to similar parts in the several figures therein.

This invention relates more particularly to machines for cutting circular disks from shells, such as clam-shells or the like, in the manufacture of pearl buttons.

The principal object of the invention is to accurately cut the circular blank from which the button is to be made.

Other objects will appear in connection with the following description.

Fig. 1 of the drawings is a central vertical longitudinal section of my improved button-cutting machine.

Fig. 2 is a view in side elevation of a broken-away portion of the machine showing the shell-clamping members clamping a shell preliminary to the cutting from the shell of a circular blank by means of the cylindrical saw.

Fig. 3 is a similar view showing the saw about to engage the shell.

Fig. 4 is a similar view showing the blank cut from the shell and within the circular saw.

Fig. 5 is a similar view showing the cut blank forced out from within the saw by means of the yielding core within the saw.

Fig. 6 is a central longitudinal section of the shell-clamping mechanism which cooperates with the shell-clamping core which is yieldingly mounted within the cylindrical saw.

Fig. 7 is a cross-section of the same taken on the broken line 7—7 in Fig. 6.

Fig. 8 is a front view of the mechanism shown in Fig. 6.

Fig. 9 is a view similar to Fig. 5 showing a modification of the invention.

Figure 1:
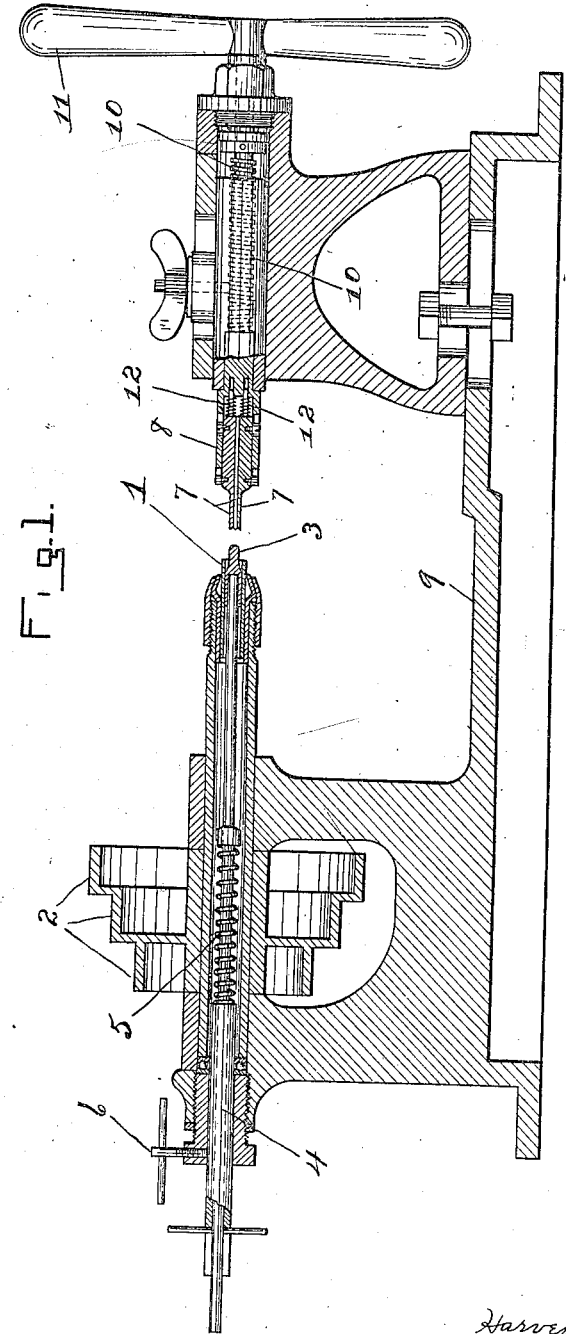

Referring to the drawings wherein the invention is shown in preferred form, the machine is in the general form of a lathe as shown in Fig. 1, having a cylindrical saw, 1, driven by means of belt-pulleys, 2, the belt not being shown.

Within the cylindrical saw, 1, is a core, 3, between which core and a stationary support, 4, is a coil-spring, 5, which tends to force the core outwardly from the cylindrical saw.

The stationary support or member, 4, is in the form of a sleeve locked in position by means of a screw, 6, whereby the tension of the spring, 5, can be varied as desired.

The core, 3, forms one member of a shell-clamping mechanism whereby a clam-shell or the like is supported in position to be acted upon by the cylindrical saw, 1.

This core member, 3, is yieldingly movable longitudinally of the saw, and normally projects beyond the saw as shown in Fig. 1, and also in Figs. 2 and 5.

The cooperating shell-clamping mechanism comprises four plungers, 7, mounted to slide longitudinally within a head, 8, which head is mounted upon the frame, 9, of the machine by means of a screw, 10, whereby said head can be moved toward and from the cylindrical saw, 1, by means of a wheel or handle, 11.

The saw, 1, is rotated rapidly with respect to the core, 3, and the cooperating shell-clamping plungers, 7.

The core, 3, is adapted to engage a clam-shell or the like at a point at the center of the blank from which a button is to be made.

The plungers, 7, are adapted to engage the same shell on the opposite side at four different points symmetrically disposed about the center of the blank from which the button is to be made.

Each of the plungers, 7, is provided with a separate spring, 12, so that each plunger engages the shell independently of the other plungers.

The operation of the machine is as follows:—

A shell, 13, is interposed between the core, 3, and the cooperative plungers, 7, as shown in Fig. 2, it being understood that the saw, 1, is being rapidly rotated.

The operator then by turning the handle or wheel, 11, causes the clamping plungers, 7, to move toward the saw, thereby clamping the shell between said members and the core, 3, and gradually forcing the core back within the saw until the saw engages the shell and cuts therefrom a circular blank, 14.

This blank as it is cut is forced within the saw as shown in Fig. 4.

After the saw has fully cut through the shell the operator reverses the movement of the handle or wheel, 11, thereby withdrawing the clamping plungers, 7, and permitting the core, 3, to be forced outward by means of the springs, 5, until the button blank, 14, is forced out from within the saw.

Continued reversed movement of the clamping plungers, 7, releases the blank from clamping pressure and permits it to drop into any subjacent receptacle not shown.

In the preferred form of my invention the core, 3, is formed to engage only the central portion of the button blank. In Fig. 9 I have shown a modification of my invention in which the core is designated, 3ª, and is adapted to engage the blank at a plurality of points preferably symmetrically disposed about the center of the blank.

What I claim as new and desire to secure by Letters Patent is

1. In a machine of the class described and in combination, a rotatory cylindrical saw; a shell-clamping core yieldingly mounted within said saw; and cooperative shell-clamping members separately yieldingly supported and movable longitudinally of said saw.

2. In a machine of the class described and in combination, a rotatory cylindrical saw; a shell-clamping core yieldingly mounted within the saw; cooperative shell-clamping members separately yieldingly supported in opposed relation to said core; and means for causing relative longitudinal movement between said saw and said shell-clamping members.

3. In a machine of the class described and in combination, a rotatory cylindrical saw; a shell-clamping core yieldingly mounted within the saw; cooperative clamping mechanism comprising a longitudinally movable head, and a plurality of shell-clamping members separately yieldingly mounted upon the head; and means for causing a longitudinal movement of the head relatively to the saw.

4. In a machine of the class described and in combination, a cylindrical saw; a shell-clamping core yieldingly mounted within the saw; shell-clamping members separately yieldingly mounted and cooperating with said shell-clamping core and of a size adapted to enter within said saw; and means for moving said shell-clamping mechanism longitudinally of the saw.

In testimony whereof, I have hereunto set my hand this 21st day of October, 1921.

HARVEY CHALMERS.